(12) United States Patent
Koishi et al.

(10) Patent No.: US 11,007,996 B2
(45) Date of Patent: May 18, 2021

(54) VEHICLE CONTROL METHOD AND VEHICLE CONTROL DEVICE

(71) Applicant: Nissan Motor Co., Ltd., Yokohama (JP)

(72) Inventors: Akifumi Koishi, Kanagawa (JP); Tomoyuki Koike, Kanagawa (JP); Atsushi Tezuka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 288 days.

(21) Appl. No.: 16/332,016

(22) PCT Filed: Sep. 15, 2016

(86) PCT No.: PCT/JP2016/077284
§ 371 (c)(1),
(2) Date: Mar. 11, 2019

(87) PCT Pub. No.: WO2018/051465
PCT Pub. Date: Mar. 22, 2018

(65) Prior Publication Data
US 2019/0359200 A1    Nov. 28, 2019

(51) Int. Cl.
*B60W 20/15* (2016.01)
*B60W 10/02* (2006.01)
(Continued)

(52) U.S. Cl.
CPC ............ *B60W 20/15* (2016.01); *B60W 10/02* (2013.01); *B60W 10/06* (2013.01); *B60W 10/08* (2013.01);
(Continued)

(58) Field of Classification Search
CPC ...... B60W 20/15; B60W 10/02; B60W 10/06; B60W 10/08; B60W 10/10;
(Continued)

(56) References Cited

U.S. PATENT DOCUMENTS

2006/0287798 A1* 12/2006 Inoue ................... B60L 15/2072
701/70
2012/0295759 A1* 11/2012 Fujiwara ............... B60W 10/02
477/167

(Continued)

FOREIGN PATENT DOCUMENTS

JP      2000-224713 A    8/2000
JP       2004-52728 A    2/2004
(Continued)

*Primary Examiner* — Geepy Pe
*Assistant Examiner* — Kyle J Kingsland
(74) *Attorney, Agent, or Firm* — Global IP Counselors, LLP (57) ABSTRACT

A vehicle control device includes a motor, a clutch and a control unit. The motor is configured to apply torque to a power transmission path between an engine and a drive wheel. The clutch is disposed between the engine and the drive wheel. The control unit stops fuel injection of the engine when the engine is greater than or equal to a prescribed engine rotational speed during deceleration, and restarts the fuel injection after disengaging the clutch, and then stops the power running of the motor after resuming the fuel injection of the engine. The control unit drives the motor to carry out power running such that a deceleration of the vehicle becomes less than or equal to a prescribed value when fuel injection of the engine is stopped.

3 Claims, 5 Drawing Sheets

(51) Int. Cl.
*B60W 10/06* (2006.01)
*B60W 10/08* (2006.01)
*B60W 10/10* (2012.01)
*B60W 30/18* (2012.01)

(52) U.S. Cl.
CPC ...... *B60W 10/10* (2013.01); *B60W 30/18136* (2013.01); *B60W 2510/0638* (2013.01); *B60W 2520/105* (2013.01); *B60W 2710/0627* (2013.01); *B60W 2710/083* (2013.01)

(58) Field of Classification Search
CPC ... B60W 30/18136; B60W 2510/0638; B60W 2520/105; B60W 2710/0627; B60W 2710/083
See application file for complete search history.

(56) References Cited

U.S. PATENT DOCUMENTS

2016/0229391 A1\* 8/2016 Shigemoto .......... B60L 15/2054
2017/0361831 A1\* 12/2017 Johri .................... B60W 20/50

FOREIGN PATENT DOCUMENTS

| JP | 2010-223399 A | 10/2010 |
| JP | 2012-236576 A | 12/2012 |
| JP | 2014-95352 A | 5/2014 |
| JP | 2015-134585 A | 7/2015 |

\* cited by examiner

VEHICLE CONTROL METHOD AND VEHICLE CONTROL DEVICE

CROSS-REFERENCE TO RELATED APPLICATIONS

This application is a U.S. national stage application of International Application No. PCT/JP2016/077284, filed on Sep. 15, 2016.

BACKGROUND

Technical Field

The present invention relates to a vehicle control method and a vehicle control device that contribute to improving fuel efficiency by stopping fuel injection of an engine during travel.

Background Information

Japanese Laid Open Patent Application No. 2015-134585 (Patent Document 1) discloses a technology in which, when deceleration of a vehicle is greater than a prescribed value, a control (hereinafter referred to as fuel cut control) for stopping a fuel injection of an engine is stopped and the engine is restarted.

SUMMARY

However, according to the technology of Patent Document 1, since the fuel cut control is stopped in order to suppress the deceleration, so it is difficult to sufficiently improve the fuel efficiency. An object of the present invention is to provide a vehicle control method that can improve the fuel efficiency.

In order to achieve the object described above, in the vehicle control method according to the present invention, during fuel cut control a motor capable of applying torque between an engine and drive wheels is made to carry out power running such that the deceleration of the vehicle is no greater than a prescribed value.

Therefore, it is possible to continue the fuel cut control while suppressing the deceleration, and to improve the fuel efficiency.

DETAILED DESCRIPTION OF THE EMBODIMENTS

Embodiments of the present invention will be explained below with reference to the appended drawings.

First Embodiment

Figure 1:
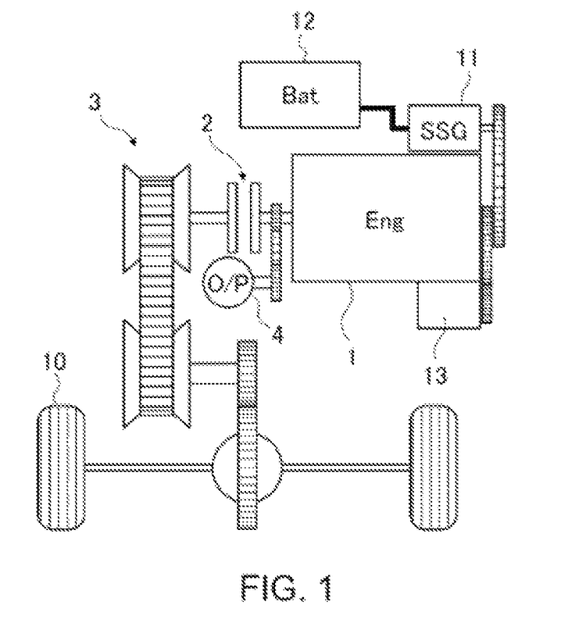
FIG. 1 is a system diagram of a vehicle to which a fuel cut control of a first embodiment is applied.

FIG. 1 is a system diagram of a vehicle to which a fuel cut control of a first embodiment is applied. In the vehicle rotation that is output from an engine 1, which is an internal combustion engine, is input to a belt-type continuously variable transmission 3 via a clutch 2. The clutch 2 is a lockup clutch provided to a torque converter. The rotation is modified by the belt-type continuously variable transmission 3 and transmitted to a pair of drive wheels 10 via a final gear, and the like. The engine 1 includes a starter generator 11 (hereinafter referred to as SSG 11), which functions as a starter motor and also as a generator, a battery 12 that sends and receives electric power to and from the SSG 11, and an air conditioner compressor 13. An oil pump 4 is provided on an output shaft of the engine 1, and the belt-type continuously variable transmission 3 is controlled by hydraulic pressure of the oil pump 4. An electric oil pump or the like may be provided, and no particular limitation is imposed.

Figure 2:
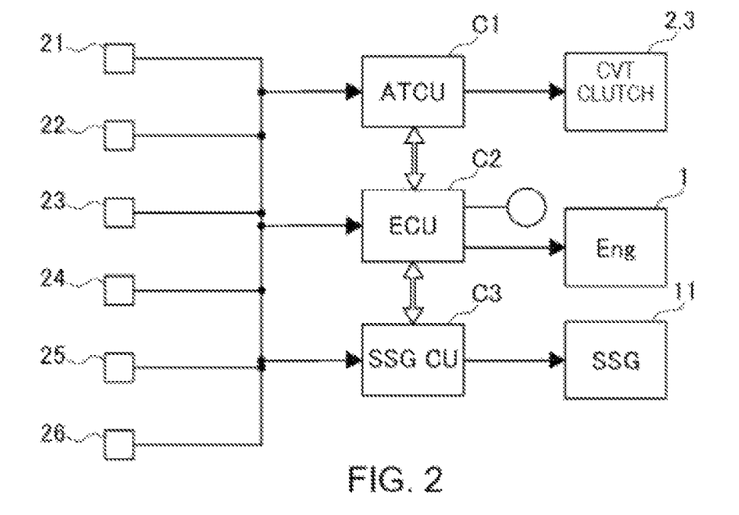
FIG. 2 is a control block diagram for carrying out the fuel cut control of the first embodiment.

FIG. 2 is a control block diagram for carrying out the fuel cut control of the first embodiment. The vehicle comprises an automatic transmission control unit C1 (hereinafter also referred to as ATCU) that controls an engagement state of the clutch 2 as well as the shifting state of the belt-type continuously variable transmission 3, an engine control unit C2 (hereinafter also referred to as ECU) that controls an operating state of the engine 1, and an SSG control unit C3 (hereinafter also referred to as SSGCU) that controls the operation state of the SSG 11.

The vehicle also comprises a turbine sensor 21 that detects a turbine rotational speed (hereinafter also referred to as Nt), which is an engine-side rotational speed of the clutch 2, a vehicle speed sensor 22 that detects the vehicle speed (hereinafter also referred to as VSP), an accelerator opening degree sensor 23 that detects the accelerator opening degree (hereinafter also referred to as APO), a brake switch 24 that detects whether a brake pedal has been depressed, an engine rotational speed sensor 25 that detects an engine rotational speed Ne, and an SOC sensor 26 that detects a charging state SOC of a battery 12. In addition to the sensors described above the vehicle further comprises a crank angle sensor that detects the engine crank angle, a cam angle sensor that detects a camshaft rotation angle, a hydraulic pressure sensor that detects various control oil pressures supplied to the belt-type continuously variable transmission 3, a current sensor that detects a current value of the SSG 11, a voltage sensor that detects a voltage value of the SSG 11, and the like.

The detection signals of the various sensors are supplied to each control unit. The control units are connected by a CAN communication line so as to be capable of mutually transmitting and receiving control information. Therefore, control information of the various sensors, for example, the accelerator opening degree sensor 23 and the engine rotational speed sensor 25 may transmit to the ECU, and the ECU may supply the control information to the other control units, and no particular limitation imposed.

Next, the fuel cut control will be described. A fuel-cut control unit (hereinafter also referred to as FC control unit) is provided in the ECU and configured to stop the fuel injection of the engine 1 when a prescribed set of conditions are satisfied in a state in which the ignition switch is ON. Specifically, the fuel injection is restarted when the APO is less than or equal to a prescribed value indicating the accelerator has been released, and the vehicle speed VSP reaches a fuel-cut-ending vehicle speed VSPfce that corresponds to a prescribed engine rotational speed at which an engine restart is possible only by restarting the fuel injection of the engine 1. Other than making a determination based on the vehicle speed VSP, it is synonymous with making a determination based on whether the engine rotational speed Ne is less than or equal to a prescribed engine rotational speed. In addition, after starting the fuel cut, if the deceleration Gx of the vehicle exceeds a fuel-cut-ending deceleration Gfce indicating a rapid deceleration, the fuel injection is restarted in order to suppress an occurrence of an excessive deceleration.

If the deceleration Gx exceeds Gfce the fuel injection is restarted and the engine braking force is reduced before the vehicle speed reaches VSPfce, opportunities for stopping the fuel injection are reduced, so there is the problem that the fuel efficiency cannot be sufficiently improved. In particular, if the compressor 13 of the air conditioner is in operation the engine braking force tends to increase, so it is necessary to restart the fuel injection at a VSP much earlier than VSPfce, so opportunities for stopping the fuel injection are reduced further. Therefore, in the first embodiment a Gx (deceleration) maintaining control is carried out in which the SSG 11 is made to carry out power running to reduce the engine braking force, and the deceleration Gx is controlled so as not to exceed Gfce. If the SOC of the battery 12 is insufficient and the SSG 11 cannot be made to carry out power running, or if the SSG 11 cannot be made to carry out power running due to other conditions, then the fuel injection is restarted when the deceleration Gx exceeds Gfce, thereby suppressing the deceleration Gx.

Figure 3:
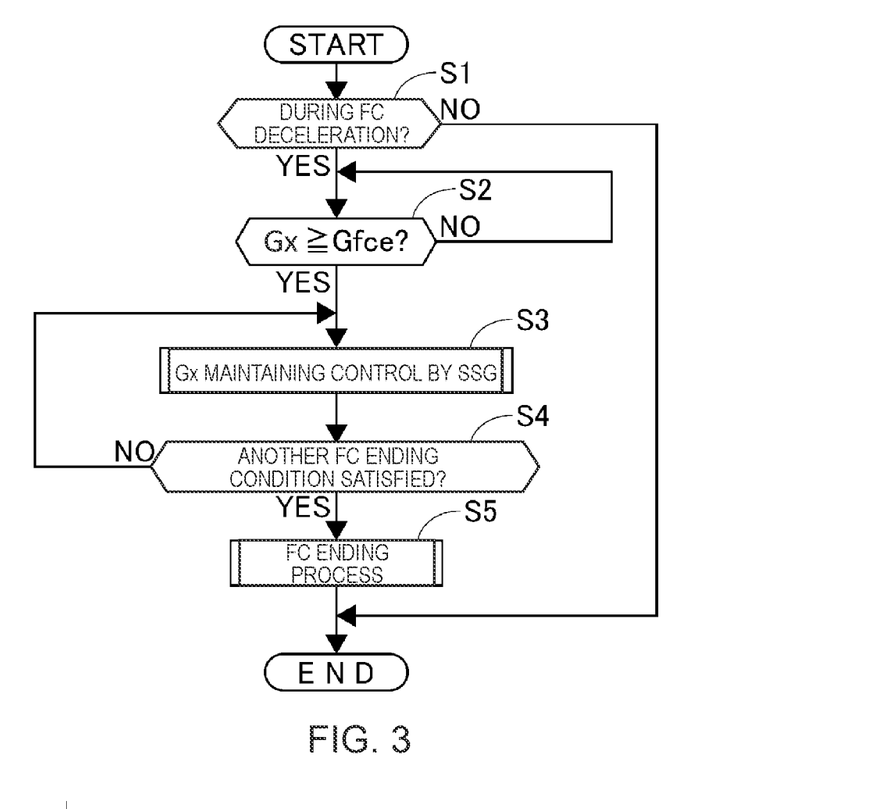
FIG. 3 is a flow chart showing a during-fuel-cut deceleration control process of the first embodiment.

FIG. 3 is a flow chart showing a during-fuel-cut deceleration control process of the first embodiment. This flow is a process carried out during the fuel cut control.

In Step S1, it is determined whether the fuel cut control (hereinafter also referred to as FC) and deceleration are being carried out; if YES, the process proceeds to Step S2, otherwise the present control flow is ended.

In Step S2, it is determined whether the deceleration Gx is greater than or equal to the fuel-cut-ending deceleration Gfce; if YES, the process proceeds to Step S3, otherwise Step S2 is repeated. The deceleration Gx represents the acceleration in the negative direction with respect to the traveling direction of the vehicle, and is a value in which the negative direction acceleration increases as the absolute value of the deceleration Gx increases.

In Step S3, the Gx maintaining control by the SSG 11 is executed (corresponding to a deceleration control unit). Specifically, a target deceleration is set to Gfce, and the power running torque of the SSG 11 is feedback-controlled such that the deceleration Gx converges to Gfce.

In Step S4, it is determined whether another FC control ending condition (for example, VSP<VSPfce, etc.) has been satisfied; if satisfied, the process proceeds to Step S5, otherwise the process returns to Step S3 and the Gx maintaining control continues. Since the deceleration Gx is thereby controlled so as not to exceed Gfce, discomfort is not imparted to the driver.

In Step S5, the FC ending process is executed. Specifically, the clutch 2 is disengaged and the fuel injection is restarted.

Figure 4:
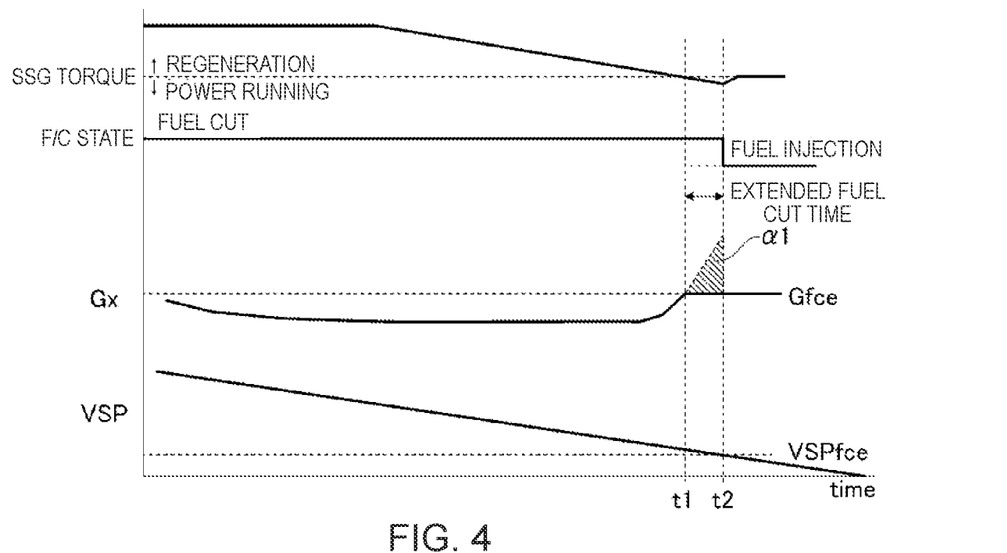
FIG. 4 is a time chart when an SSG is generating a regenerative torque, while decelerating during the fuel cut control of the first embodiment.

The actions will be described next. FIG. 4 is a time chart when the SSG is generating a regenerative torque, while decelerating during the fuel cut control of the first embodiment.

At time t1, if the deceleration Gx reaches Gfce during the fuel cut control the SSG 11 is made to carry out power running to reduce the engine braking force, and the deceleration Gx is controlled so as not to exceed Gfce. Therefore, the fuel injection accompanying the exceeding of Gfce by deceleration Gx is not restarted at this time. When the vehicle speed VSP falls below VSPfce at time t2, the fuel injection is restarted.

The hatched region a1 shown for the deceleration Gx between time t1 and t2 in FIG. 4 is a deceleration region that is reduced by the power running of the SSG 11. Since the SSG 11 is regenerating before reaching time t1 the fuel efficiency can be improved by recovering the kinetic energy of the vehicle and supplying said energy between time t1 and t2.

Figure 5:
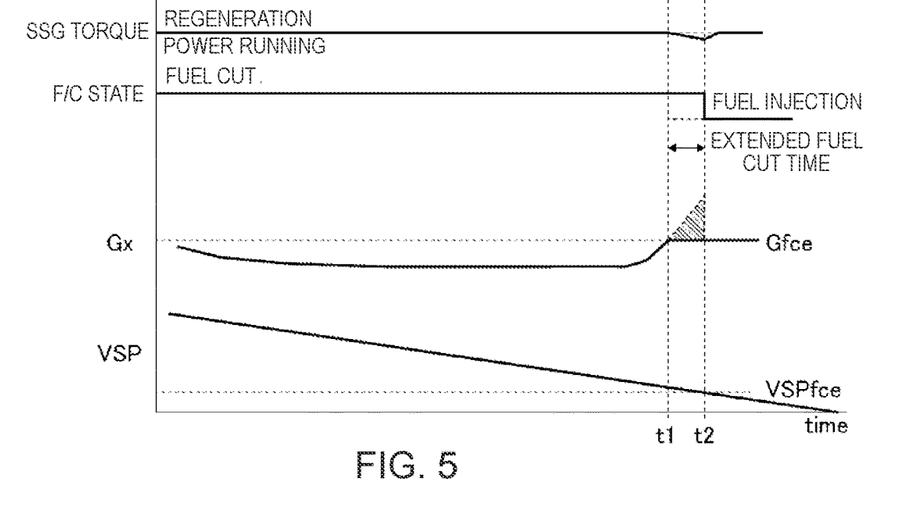
FIG. 5 is a time chart when the SSG is not carrying out power running or regeneration, while decelerating during the fuel cut control of the first embodiment.

FIG. 5 is a time chart when the SSG is neither carrying out power running nor regeneration, while decelerating during the fuel cut control of the first embodiment. The efficiency of the energy conversion from the electric power of the SSG 11 to torque, which is used between time t1 to t2, is better than the efficiency of the energy conversion from gasoline, which is injected when the fuel injection is restarted during this time, to torque; therefore, the energy consumption of the entire vehicle can be improved.

As described above, the effects listed below can be obtained with the first embodiment.

(1) An SSG 11 (motor) is provided that is configured to apply torque to a power transmission path between the engine 1 and the drive wheel 10, and the SSG 11 is driven to carry out power running such that a deceleration Gx of the vehicle becomes less than or equal to Gfce (prescribed value) when the fuel injection of the engine 1 is stopped while decelerating and the VSP is greater than or equal to VSPfce (the engine rotational speed is greater than or equal to a prescribed engine rotational speed).

Accordingly, it is possible to ensure an opportunity to carry out the fuel cut control while suppressing the deceleration Gx, thereby improving the fuel efficiency.

(2) The fuel injection of the engine 1 is restarted when the deceleration Gx of the vehicle is greater than Gfce (prescribed value) while the fuel injection of the engine 1 is stopped.

Accordingly, it is possible to reduce the engine braking force and to suppress the generation of excessive deceleration Gx, thereby making it possible to prevent discomfort from being imparted to the driver.

Second Embodiment

Figure 6:
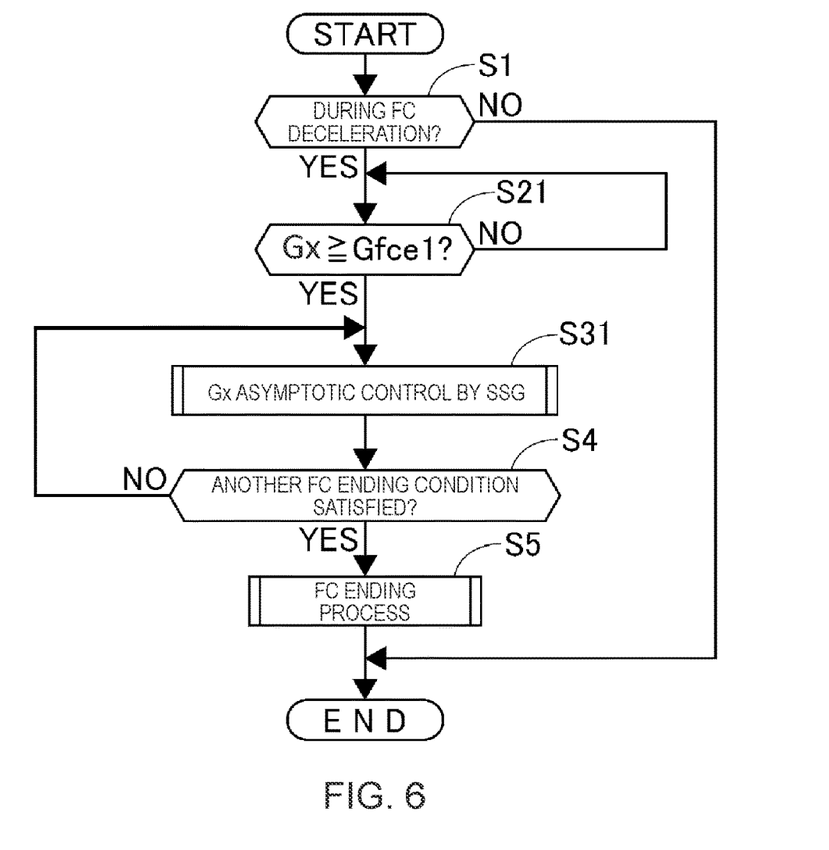
FIG. 6 is a flow chart showing a during-fuel-cut deceleration control process of a second embodiment.

The second embodiment will be described next. Since the basic configuration is the same as the first embodiment, only the difference will be described. FIG. 6 is a flow chart showing the during-fuel-cut deceleration control process of the second embodiment. This flow is a process that is carried out during the fuel cut control.

In Step S1, it is determined whether the fuel cut control and the deceleration are being carried out; if YES, the process proceeds to Step S21, otherwise the present control flow is ended.

In Step S21, it is determined whether the deceleration Gx is greater than or equal to a prescribed deceleration Gfce1, which is less than a fuel-cut-ending deceleration Gfce2; if YES, the process proceeds to Step S31, otherwise Step S21 is repeated. The absolute value of Gfce1 is smaller than the absolute value of Gfce2.

In Step S31, a Gx (deceleration) asymptotic control by the SSG 11 is executed (corresponding to a deceleration control unit). Specifically, a target deceleration is set gradually from Gfce1 to a value approaching Gfce2, and the power running torque of the SSG 11 is feedback-controlled such that the deceleration Gx gradually converges to Gfce2.

In Step S4, it is determined whether another FC control ending condition (for example, VSP<VSPfce, etc.) has been satisfied; if satisfied, the process proceeds to Step S5, otherwise the process returns to Step S31 and the Gx asymptotic control continues. Thus, the deceleration Gx is controlled so as not to exceed Gfce2, so discomfort is not imparted to the driver.

In Step S5, the FC ending process is executed. Specifically, the clutch 2 is disengaged and the fuel injection is restarted. An engine rotational speed fluctuation suppression process is then executed for suppressing change in the engine rotational speed by means of the torque control of the SSG 11. The details will be described further below.

Figure 7:
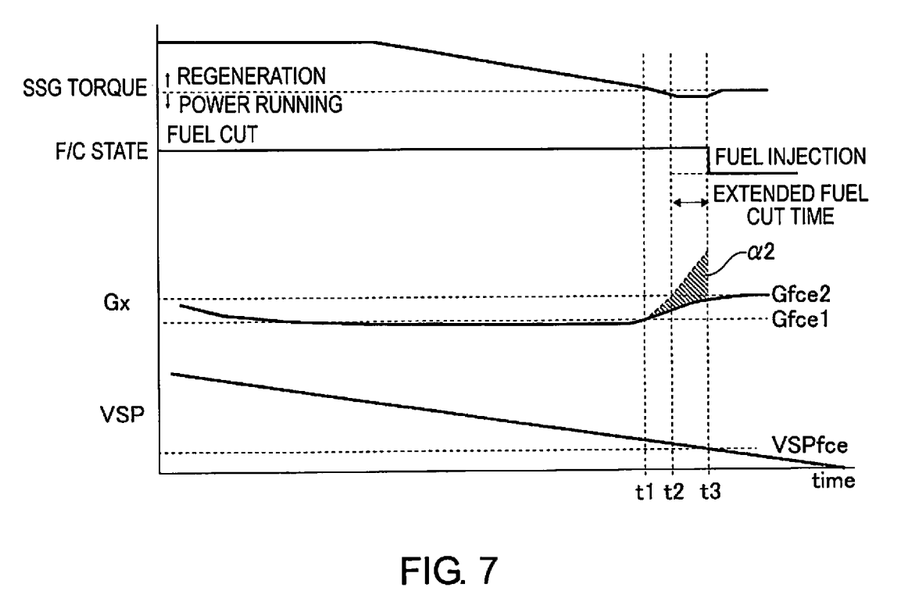
FIG. 7 is a time chart when an SSG is generating a regenerative torque, while decelerating during the fuel cut control of the second embodiment.

The operation is described next. FIG. 7 is a time chart when the SSG is generating a regenerative torque, while decelerating during the fuel cut control of the second embodiment.

At time t1, if the deceleration Gx reaches Gfce1 during the fuel cut control, then the SSG 11 is driven to carry out power running to reduce the engine braking force, and the deceleration Gx is controlled so as not to exceed Gfce2. At this time, the deceleration Gx is made to approach Gfce2. Therefore, since the power running by the SSG 11 is started before the timing at which the power running of the SSG 11 is started in the first embodiment, it is possible to suppress a sudden change in the deceleration Gx. If the power running of the SSG 11 is not carried out, then the deceleration Gx exceeds Gfce2, so fuel injection will be restarted at time t2. In contrast, in the second embodiment, the deceleration Gx does not exceed Gfce2, so the fuel injection is not restarted. When the vehicle speed VSP falls below VSPfce at time t3, the fuel injection is restarted.

The hatched region a2 shown for the deceleration Gx between time t1 and t2 in FIG. 7 is the deceleration region that is reduced by the power running of the SSG 11. Since the SSG 11 is regenerating before reaching time t1 the fuel efficiency can be improved by recovering the kinetic energy of the vehicle and supplying said energy between time t1 and t3.

Figure 8:
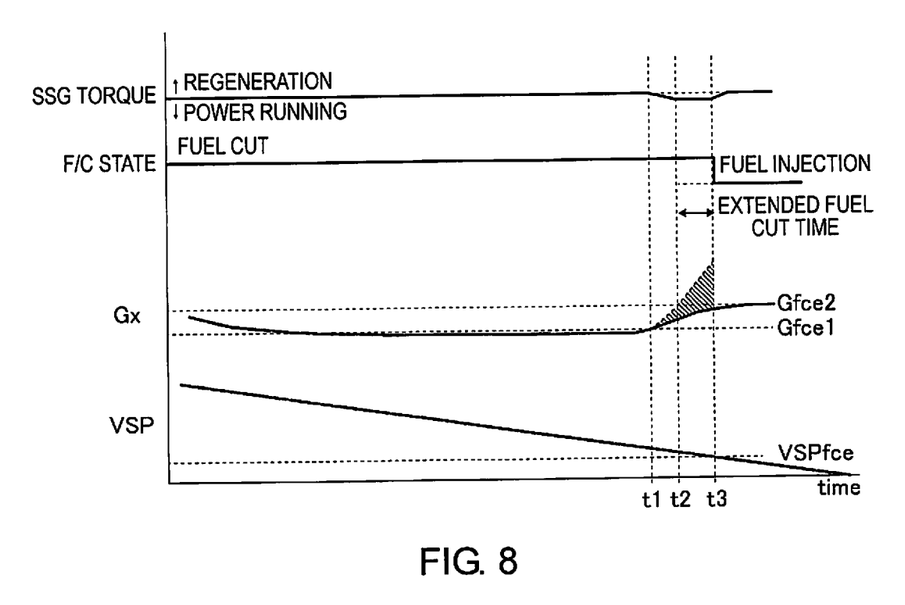
FIG. 8 is a time chart when the SSG is not carrying out power running or regeneration, while decelerating during the fuel cut control of the second embodiment.

FIG. 8 is a time chart when the SSG is neither carrying out power running nor regeneration, while decelerating during the fuel cut control of the second embodiment. The efficiency of the energy conversion from the electric power of the SSG 11 to torque, which is used between time t1 to t3, is better than the efficiency of the energy conversion from gasoline, which is injected when the fuel injection is restarted between time t2 to t3, to torque; therefore, the energy consumption of the entire vehicle can be improved.

Figure 9:
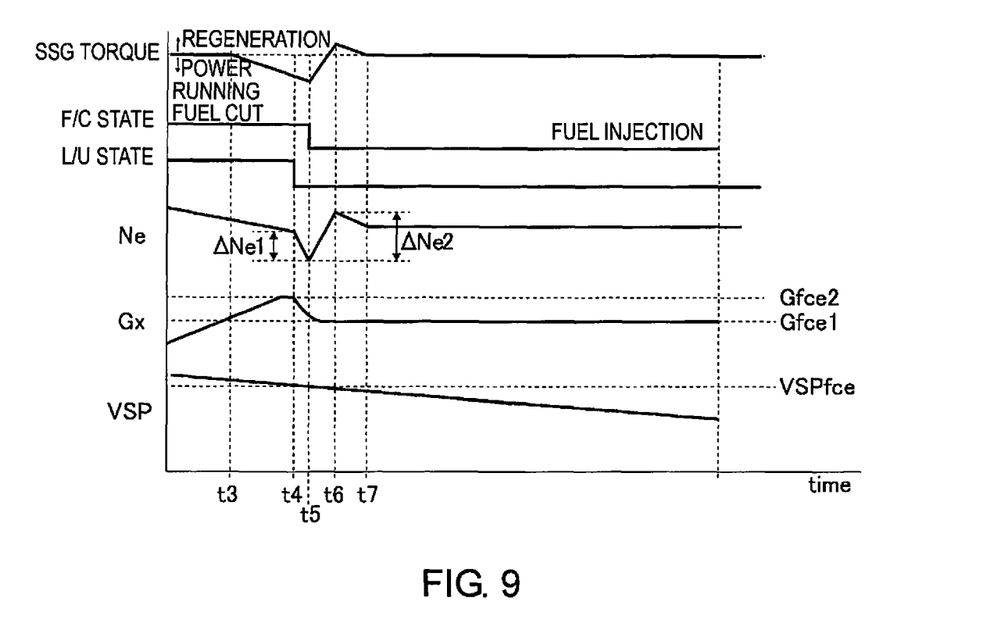
FIG. 9 is a time chart showing an engine rotational speed fluctuation suppression process in an FC ending process of the second embodiment.

FIG. 9 is a time chart showing an engine rotational speed fluctuation suppression process in the FC ending process of the second embodiment.

When the Gx asymptotic control is started at time t3 and VSP falls below VSPfce at time //t4//, the clutch 2 is first disengaged (see the curve "L/U STATE" in FIG. 9). Thus, it is possible to prevent the torque fluctuation accompanying the engine restart from being transmitted to the drive wheels 10.

Next, even if the clutch 2 is disengaged at time t4, the power running of the SSG 11 is continued. That is, if the clutch 2 is disengaged in a state in which the fuel injection is stopped, then the engine rotational speed Ne tends to abruptly decrease. Therefore, an engine rotational speed decrease amount $\Delta$Ne1, from when the fuel injection is restarted until time t5 at which the engine 1 starts autonomous rotation, becomes large, which may impart discomfort to the driver. Accordingly, the engine rotational speed decrease amount $\Delta$Ne1 can be suppressed by continuing the power running of the SSG 11 even after the clutch 2 is disengaged.

Next, if the operation of the SSG 11 is stopped immediately after the engine 1 starts the autonomous rotation at time t5, a revving amount $\Delta$Ne2 of the engine rotational speed Ne due to complete combustion is increased, which may impart discomfort to the driver. Therefore, after the complete combustion of the engine the revving amount $\Delta$Ne2 can be suppressed by regenerating the SSG 11.

In addition to the effects of the first embodiment described above, the following effects can be obtained with the second embodiment.

(3) The clutch 2 is provided between the engine 1 and the drive wheel 10, and when restarting the fuel injection of the engine 1, the fuel injection is resumed after the clutch 2 is disengaged, after which the power running of the SSG 11 is stopped. In other words, the clutch 2 is disengaged and the fuel injection is resumed before the power running of the SSG 11 is stopped. Accordingly, it is possible to prevent the engine rotational speed Ne from greatly decreasing after the clutch 2 is disengaged, and to prevent discomfort from being imparted to the driver.

(4) When restarting the fuel injection of the engine 1 the fuel injection is restarted after the clutch 2 is disengaged, and after the complete combustion of the engine regenerative torque is applied by means of the SSG 11. Accordingly, it is possible to prevent the engine rotational speed Ne from greatly revving after the complete combustion of the engine, and to prevent discomfort from being imparted to the driver.

OTHER EMBODIMENTS

The present invention was described above based on the embodiments, but the specific configuration may be another configuration. In the first embodiment an example was shown in which the belt-type continuously variable transmission 3 is employed as the transmission, but another type of transmission may be used. In addition, the clutch 2 of the first embodiment may be a start clutch inside the transmission. Additionally, in the first embodiment the SSG 11 that can transmit torque to the crankshaft of the engine 1 was used, but the motor/generator may be disposed in other places, such as between the engine and the transmission or between the transmission and the drive wheels, as long as it is on the power transmission path between the engine 1 and the drive wheels 10.

The invention claimed is:

1. A vehicle control method for controlling a vehicle having a motor configured to apply torque to a power transmission path between an engine and a drive wheel, and a clutch downstream of the engine and the motor and upstream of the drive wheel along the power transmission path, the vehicle control method comprising:

driving the motor to carry out power running such that a deceleration of the vehicle becomes less than or equal to a prescribed value when fuel injection of the engine is stopped while decelerating and an engine rotational speed is greater than or equal to a prescribed engine rotational speed; and restarting the fuel injection after disengaging the clutch, and then stopping the power running of the motor after resuming the fuel injection of the engine.

2. The vehicle control method according to claim 1, wherein the fuel injection of the engine is restarted when the deceleration of the vehicle is greater than the prescribed value while the fuel injection of the engine is stopped.

3. A vehicle control device comprising:

a motor configured to apply torque to a power transmission path between an engine and a drive wheel;

a clutch disposed downstream of the engine and the motor and upstream of the drive wheel along the power transmission path;

a fuel cut control unit that stops fuel injection of the engine when the engine rotational speed is greater than or equal to a prescribed engine rotational speed during deceleration, and that restarts the fuel injection after disengaging the clutch, and then stops the power running of the motor after resuming the fuel injection of the engine; and a deceleration control unit that drives the motor to carry out power running such that a deceleration of the vehicle becomes less than or equal to a prescribed value when fuel injection of the engine is stopped.

\* \* \* \* \*